US005876187A

United States Patent [19]
Afromowitz et al.

[11] Patent Number: 5,876,187
[45] Date of Patent: Mar. 2, 1999

[54] MICROPUMPS WITH FIXED VALVES

[75] Inventors: Martin A. Afromowitz, Mercer Is.; Ronald L. Bardell, Seattle; Alan P. Blanchard, Seattle; Fred K. Forster, Seattle; Nigel R. Sharma, Bothel, all of Wash.

[73] Assignee: University of Washington, Seattle, Wash.

[21] Appl. No.: 401,546

[22] Filed: Mar. 9, 1995

[51] Int. Cl.$^6$ ........................................................ F04B 17/00
[52] U.S. Cl. ........................ 417/322; 417/413.2; 137/814; 137/826; 137/833
[58] Field of Search ............................... 417/413.2, 413.3, 417/322; 137/545, 814, 826, 833

[56] References Cited

U.S. PATENT DOCUMENTS

| | | |
|---|---|---|
| 1,329,559 | 2/1920 | Tesla . |
| 2,856,962 | 10/1958 | Christoph . |
| 3,068,880 | 12/1962 | Riordan . |
| 3,191,623 | 6/1965 | Bowles . |
| 3,375,842 | 4/1968 | Reader . |
| 3,412,745 | 11/1968 | Kelley . |
| 3,459,206 | 8/1969 | Dexter . |
| 3,461,897 | 8/1969 | Kwok . |
| 3,472,256 | 10/1969 | Hartman . |
| 3,472,258 | 10/1969 | Blosser, Jr. . |
| 3,480,030 | 11/1969 | Bermel . |
| 3,481,353 | 12/1969 | Hatch, Jr. . |
| 3,534,754 | 10/1970 | Beeken . |
| 3,552,414 | 1/1971 | Sutton . |
| 3,554,209 | 1/1971 | Brown et al. . |
| 3,570,511 | 3/1971 | Bermel . |
| 3,604,442 | 9/1971 | Tucker . |
| 3,654,946 | 4/1972 | Wieme . |
| 3,657,930 | 4/1972 | Jacobson ................................. 417/322 |
| 3,752,187 | 8/1973 | Retallick . |
| 3,798,727 | 3/1974 | Brock . |
| 3,942,558 | 3/1976 | Honda et al. . |
| 4,068,144 | 1/1978 | Toye . |
| 4,188,977 | 2/1980 | Laakaniemi et al. . |
| 4,441,526 | 4/1984 | Taft et al. . |
| 4,512,371 | 4/1985 | Drzewiecki et al. . |
| 4,716,935 | 1/1988 | Srour et al. . |
| 4,830,053 | 5/1989 | Shaw . |
| 5,197,517 | 3/1993 | Perera . |
| 5,265,636 | 11/1993 | Reed . |

FOREIGN PATENT DOCUMENTS

| | | | |
|---|---|---|---|
| 2149778 | 6/1990 | Japan | ................................. 417/413.2 |
| WO 94/19609 | 9/1994 | WIPO . | |

OTHER PUBLICATIONS

John Gosh: Tiny Just Got Smaller, pp. 137–138 *Electronics*, Apr. 1990.

Gail M. Robinson: Silicon Micropump Replaces Bulky Insulin System, pp. 109–110 *Design News*, Oct. 19, 1992.

T.M. Bloomstein and D.J. Ehrlich: Laser–Chemical Three Dimensional Writing for Microelectromechanics and Application to Standard–Cell Microfluidics, pp. 2871–2874 *J. Vac. Sci. Technol. B* 10 (6), Nov./Dec. 1992.

Erik Stemme and Goran Stemme: A Valveless Diffuser/Nozzle–Based Fluid Pump, pp. 159–167 *Sensors and Actuators A. 39,* 1993.

Bang, Melzak and Mehregany: From Microchips to MEMS, pp. 15–20 *Microlithography World,* Spring 1994.

*Primary Examiner*—Charles G. Freay
*Attorney, Agent, or Firm*—Greenlee, Winner & Sullivan, P.C.

[57] ABSTRACT

Micropumps fabricated by micromachining techniques and employing fixed or no-moving-parts valves. As one aspect of the invention, a laser-assisted chemical etching technique is employed for providing smooth-walled, curved configuration necessary to obtain the desired flow characteristics of the valves that are used in conjunction with the micropump.

43 Claims, 7 Drawing Sheets

MICROPUMPS WITH FIXED VALVES

FIELD OF THE INVENTION

The present invention relates to micromachined pumps that incorporate or otherwise work in conjunction with valves that have no moving parts.

BACKGROUND AND SUMMARY OF THE INVENTION

Miniature pumps, hereafter referred to as micropumps, can be constructed using fabrication techniques adapted from those applied to integrated circuits. Such fabrication techniques are often referred to as micromachining. Micropumps are in great demand for environmental, biomedical, medical, biotechnical, printing, analytical instrumentation, and miniature cooling applications. Just as in larger applications, various pump designs are required for different micropump systems.

The valve components of micropumps may include passive polysilicon check valves, gas-controlled valves with silicon membranes, solenoid-actuated valves with nickel diaphragms, and magnetically or electro-statically driven control valves. Valves that include components that are actuated or otherwise driven can be characterized as active valves. Manufacture and operation of active valves can add substantial complexity and cost to the production of micropumps.

Passive-type valves, such as those having movable polysilicon check valves, can be manufactured with reduced complexity, although these valves can fail when the pumped fluid includes particulates. In this regard, the particulate sizes are of the same order of magnitude as the passages in the micropumps. The passive valves become obstructed by particulates and are, therefore, unable to provide a sufficient seal when required. As a result, such valves have limited effectiveness when employed for pumping fluids that include particulates.

Similarly, active valves that employ substantially rigid sealing membranes or diaphragms are susceptible to seal failure when used to pump fluids containing particulates. The particulates become embedded in the sealing surface as a result of the relatively high pressure applied to the rigid diaphragm as needed to ensure a seal with such a valve. Once the particulates become embedded in the sealing surface, the valve is thereafter prevented from fully closing.

Fixed valves are valves having no moving parts. Fixed valves represent the utmost simplicity and high reliability for pumping fluids. Such valves, which do not include parts that periodically seal and move apart, are especially advantageous for micropump systems used for pumping fluids that include particulates. Moreover, fixed-valve pumps are particularly useful for biological applications that require pumping fluids that contain cells. The cells are not damaged by the fixed valve pumps, as would otherwise occur in moving-parts valves.

The effectiveness of fixed valves can be characterized by the parameter "diodicity," which is the ratio of pressure drop in the reverse-direction fluid flow through the valve to the pressure drop in the forward-direction fluid flow through the valve, for a given flow rate. A basic design consideration for a fixed valve micropump is to develop valve configurations that result in a diodicity greater than 1.0. In this regard, the small size of such valves, and the very low flow range (100 nl/min to 50 ml/min, for example) will typically yield a relatively low Reynolds number, which number is a dimensionless parameter that is proportional to the product of the valve size and flow velocity. Accordingly, the valve configurations must effect the requisite diodicity in flows characterized by low Reynolds numbers, where flow separation and turbulence (with attendant significant pressure losses) are unlikely to occur.

U.S. Pat. No. 1,329,559 discloses a fixed valve that is designated as a "valvular conduit." The conduit is provided with enlargements, recesses, and projections that are said to offer virtually no resistance to the passage of fluids in one direction, yet provide a nearly impassible barrier to fluid flow in the opposite direction. When an oscillating flow of fluid is applied to one end of the conduit, the conduit acts as a one-way valve or fluidic diode, thereby permitting the oscillated or pulsed fluid to be pumped through the conduit. The conduit is mounted to a piston that is rapidly reciprocated to provide the pulsed flow of fluid through the conduit.

The valvular conduit described in U.S. Pat. No. 1,329,559 is full-sized, constructed of metal, and used for delivering fluids with flows that can most likely be characterized as having a relatively high Reynolds number. No insight is provided in that patent as to how such a conduit could be adapted to a micropump system and flows characterized by low Reynolds numbers.

The present invention is generally directed to the fabrication of a micropump that employs fixed inlet and outlet valves. In one preferred embodiment of the invention, the micropump is fabricated by micromachining techniques and operates as a diaphragm pump driven by a piezoelectric actuator and having fixed valves that effect the necessary diodicity of greater than 1.0.

As one aspect of the invention, a laser-assisted chemical etching fabrication technique is employed for providing smooth-walled, curved configurations of portions of the fixed valves. A fabrication technique known as LIGA may also be employed.

As another aspect of the invention, the fixed valves include discrete branches for substantially redirecting the reverse flow therethrough, thereby generating the pressure loss differences requisite for a valve diodicity of greater than 1.0.

As another aspect of the invention, the fixed valves include diffuser and nozzle configurations for generating the relatively high pressure losses in the reverse-flow direction.

The present invention can be implemented in a variety of ways. For example, a micropump fabricated by surface or bulk micromachining techniques can be connected to a fluidic circuit in which is incorporated a fixed valve of the present invention.

The foregoing and additional features and advantages of the present invention will be more readily apparent from the following detailed description, which proceeds with reference to the accompanying drawings.

DETAILED DESCRIPTION

Figure 1:
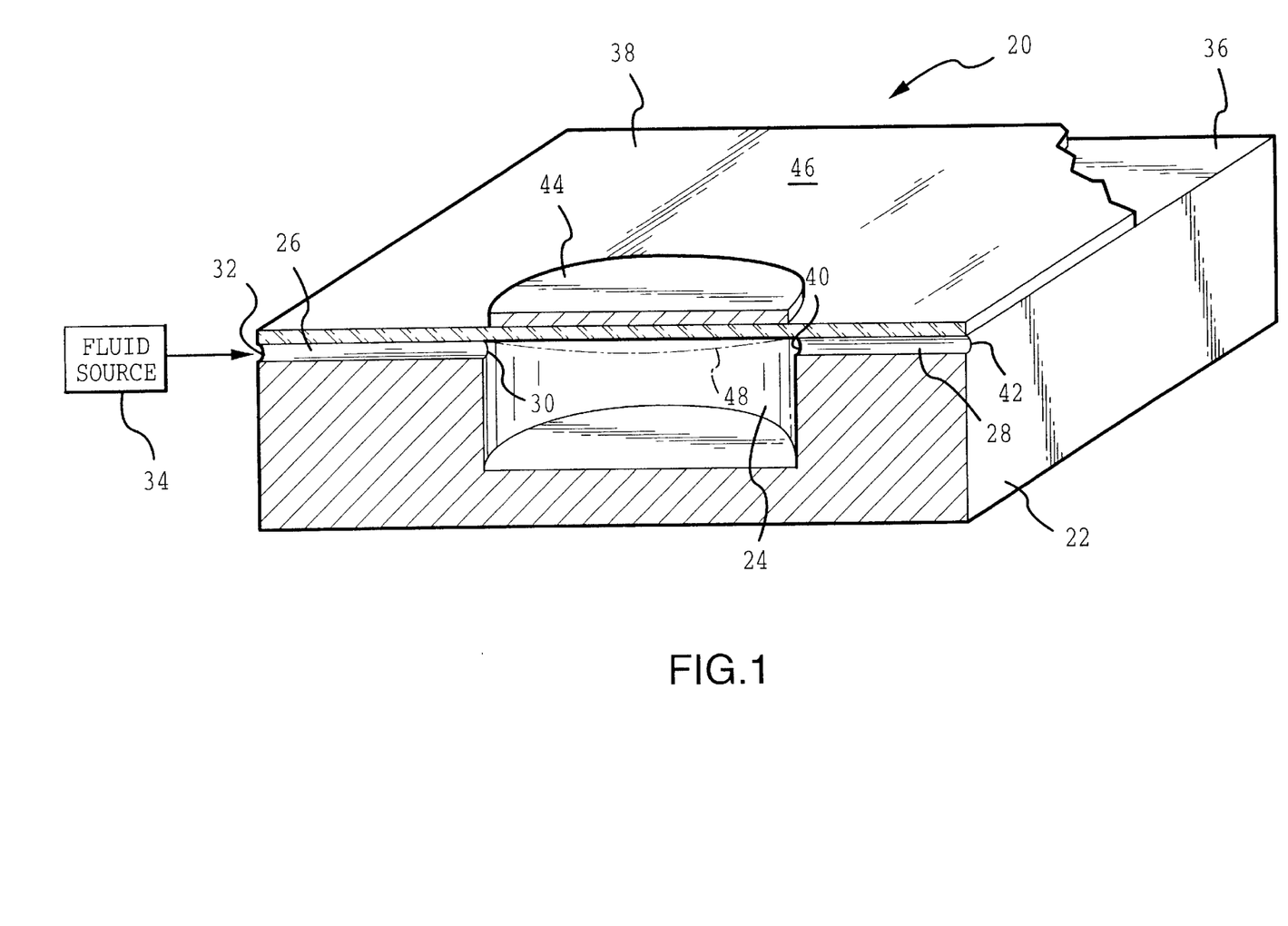
FIG. 1 is a schematic cross sectional diagram of a micromachined pump with fixed valves.

The present invention is best understood with reference to FIG. 1, which, although not to scale, illustrates the general principles of a micropump formed in accordance with the present invention. The pump 20 includes a base 22. Preferably, the base 22 is a silicon or polysilicon material. A pump cavity 24 is formed in the base. The shape of the pump cavity is cylindrical.

Also formed in the base 22 are an inlet valve 26 and an outlet valve 28. The inlet valve 26 is formed so that its inner end 30 is connected to the pump cavity 24. The outer end 32 of the inlet valve 26 is connected to a fluid source 34. The inlet valve 26 is formed in the upper surface 36 of the base 22 and is covered by a thin, deformable cover plate 38, formed, for example, of heat-treated glass, such as Pyrex brand. The cover plate is bonded to the surface 36 of the base.

The outlet valve 28, like the inlet valve, has an inner end 40 that is connected to the cavity 24 and an outer end 42.

The cover plate 38 extends to cover the outlet valve 28, cavity 24 and inlet valve 26 so that those components are completely enclosed but for the outer end 32 of the inlet valve and the outer end 42 of the outlet valve.

A piezoelectric disk 44 is mounted to the outer surface 46 of the cover plate overlying the center of the pump cavity 24. The piezoelectric disk is actuated to cause deformation of the cover plate in the vicinity of the pump cavity, thereby causing the pump to operate as a diaphragm-type. In this regard, the effect of the actuation is to cause the cover plate 38 to periodically deform, such as shown with dashed line 48, into the pump cavity, thereby reducing the volume of the cavity and tending to pump fluid from the cavity through both the inlet valve 26 and the outlet valve 28.

The periodic return of the cover plate to its initial state (or beyond) has the effect of increasing the previously diminished pump cavity, thereby tending to draw fluid back into the cavity through both the inlet valve 26 and the outlet valve 28.

As will be described more fully below, the inlet and outlet valves 26, 28 are configured with no moving parts, yet shaped so that fluid flow through the valves is restricted less in one direction than in the other direction. More particularly, the configuration of the inlet valve 26 is such that the fluid flow therethrough is restricted less in the direction from the outer end 32 to the inner end 30, toward the cavity 24, than in the direction away from the cavity.

The configuration of the outlet valve 28 is such that the fluid flow therethrough is restricted less in the direction from the inner end 40 to the outer end 42, away from the cavity, than the flow is restricted in the direction toward the cavity.

With respect to FIG. 1, the reverse direction of flow for the illustrated pump is in the direction from right to left. The forward direction of fluid flow is left to right. As a consequence of the valve configurations described below, the pressure drop for reverse direction flow is greater than the pressure drop for forward direction flow of the pump, so that a diodicity of greater than 1.0 is achieved. Consequently, the net flow of fluid through the pump is in the forward direction, as desired.

Figure 2:
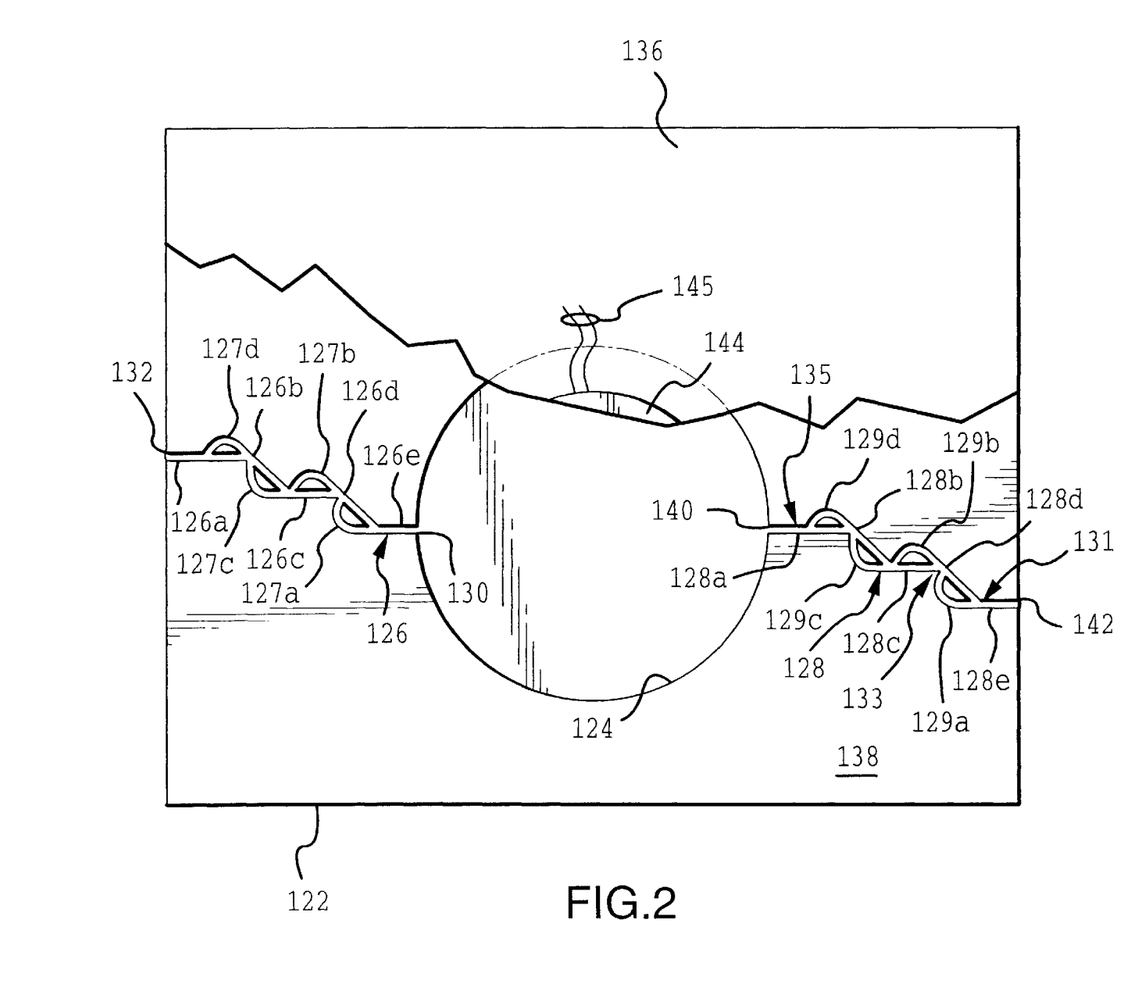
FIG. 2 is a top plan diagram of a micromachined pump with fixed valves, formed in accordance with one aspect of the present invention.

FIG. 2 depicts a top plan view of the primary components of a micropump formed in accordance with a preferred embodiment of the invention. The diagram of FIG. 2 is a reproduction of a mask used as part of an anisotropic wet chemical etching process for forming a pump cavity and inlet and outlet valves in accordance with an alternative fabrication process, as described more fully later. In the present embodiment, the mask diagram is intended to depict the shape of these components in conjunction with a description of a preferred fabrication technique known as laser-assisted chemical etching or "LACE".

Depicted in FIG. 2 is a generally cylindrical pump cavity 124 formed in a silicon or polysilicon base 122. An inlet valve 126 is etched into the base. The inlet valve 126 comprises an elongated conduit having an inner end 130 connected to the cavity 124 and an outer end 132 that may be connected to a source of fluid to be pumped (not shown).

The outlet valve 128 is also etched into the base 122 and includes an inner end 140 that is in fluid communication with the cavity 124. The outer end 142 of the outlet valve 128 is exposed for connection to suitable tubing for receiving the pumped fluid.

A thin, deformable glass cover plate 138 is secured to the top surface 136 of the pump base 122 by an anodic bonding apparatus described more fully below. A piezoelectric disk 144 is centered over the cavity 124 and glued to the cover plate. Electrical leads 145 are exposed for connection to a suitable pulsed current source for actuating the piezoelectric disk to provide the periodic deformation and return of the cover plate 138. The periodic deformation of the plate 138 causes the pump to alternate between a pumping mode, during which fluid within the cavity 124 is forced into the inlet valve 126 and outlet valve 128, and a suction mode, during which fluid is drawn toward the cavity 124 through the inlet valve 126 and outlet valve 128.

With continued reference to FIG. 2, the shape of the outlet valve 128 is such that the forward path of fluid flow is defined by the generally straight, contiguous series of conduit portions 128a–e, extending from the inner end 140 to the outer end 142, respectively.

When the pump is in the suction mode, the flow of fluid in the outlet valve 128 is in the reverse direction, from the outer end 142 toward the cavity 124. As a result, a substantial amount of the fluid in the outlet valve 128 is directed into discrete branches of the outlet conduit. These branches, depicted as valve portions 129a, 129b, 129c and 129d, are also etched in the pump surface 136.

Specifically, at the outermost junction of each branch 129a–d and a corresponding conduit portion 128a–e, such as the junction shown at 131, flow in the reverse direction is diverted into a branch 129a. The branch 129a is curved so that the flow through the branch exits the branch at the downstream junction of that branch 129a and its associated conduit portion 128d, which downstream junction is shown at 133 in FIG. 2 (this junction designated downstream inasmuch as the flow considered here is in the reverse direction; that is, right to left in FIG. 2).

It will be appreciated upon reviewing FIG. 2 that the confluence of the reverse-direction flow in the branch 129a and in the conduit portion 128d is such that the overall flow momentum will be directed generally away from the inner end 140 of the outlet valve 128. Put another away, the geometry of the outlet valve is such that the valve branches 129a–d impart substantial restriction to flow in the reverse direction, thereby generating high pressure losses in the reverse flow direction, as compared to the forward flow direction discussed next.

When the pump alternates to the pump mode (that is, the cover plate 138 deforms to rapidly decrease the cavity volume), the flow through the outlet valve 128 is in the forward direction, left to right in FIG. 2. Practically no amount of fluid flow in the forward direction is diverted to the branches 129a–d because the upstream junction (here, considered in the forward flow sense) of each branch 129a–d, such as shown at 135 in FIG. 2, is oriented so that the forward flow in the conduit portions 128a–e will maintain a generally straight path, bypassing the upstream junctions and branches.

Considering still the forward flow direction, it is noteworthy that the overall forward flow path departs from a straight line. Specifically, at the location in the conduit where each straight portion 128a–e joins the contiguous portion, the forward flow is redirected, for example, by about 45° in this embodiment. Even though the forward flow is redirected from a straight line, the overall momentum of the forward flow remains in the forward direction. Accordingly, the pressure losses in the forward direction are lower than the pressure losses in the reverse direction; hence, the diodicity of the outlet valve 128 will be greater than 1.0.

In the embodiment depicted in FIG. 2, the inlet valve 126 is substantially identical in shape to the outlet valve 128. As a result, the forward flow path through the inlet valve is defined by the contiguous series of conduit portions 126a–e. Inasmuch as the inlet valve 126 also includes the discrete branches 127a–d, it will be appreciated that pressure losses in the reverse flow direction for the inlet valve 126 (that is, away from the cavity 124) will be greater than the pressure losses in the forward direction; hence, the inlet valve will also have a diodicity greater than 1.0.

Inasmuch as the inlet and the outlet valves have the diodicity greater than one, the net flow of the pump will be in the forward direction.

In a preferred embodiment, the pump components are quite small. For example, the diameter of the pump cavity may be 6 mm or less. The valves 126, 128 may be etched into the surface 136 of the base 22 to a depth of, for example, 30 $\mu$m. The width of the valves may be smaller or larger than the depth. In preferred embodiments, the pumps generate very low net flow rates, in the range of about 50 to 130 $\mu$l/min. The pumps generate a blocked-flow pressure head of up to 32 cm of water. Because of the small size of the valve passages and the limited amount of fluid flow through the pump, it is important that the conduit geometries be precisely formed to effectively conduct the forward and reverse flows in the manner just described. Irregularities in the walls of the conduit and the branches can alter the flow characteristics in the valve, which can lead to a lesser than desired diodicity, or complete failure of the valve.

In order to obtain a precisely defined geometry of the inlet and outlet valves, the above-mentioned etching is carried out with an apparatus that effects laser-assisted chemical etching (LACE). An apparatus and method for carrying out this laser-assisted technique is described in an article authored by T. M. Bloomstein and D. J. Ehrlich, "Laser-Chemical Three-Dimensional Writing for Microelectronics and Application to Standard-Cell Microfluidics," *J. Vac. Ci. Technol.*, B10(6), Nov./Dec. 1992, hereby incorporated by reference and summarized next.

Figure 3:
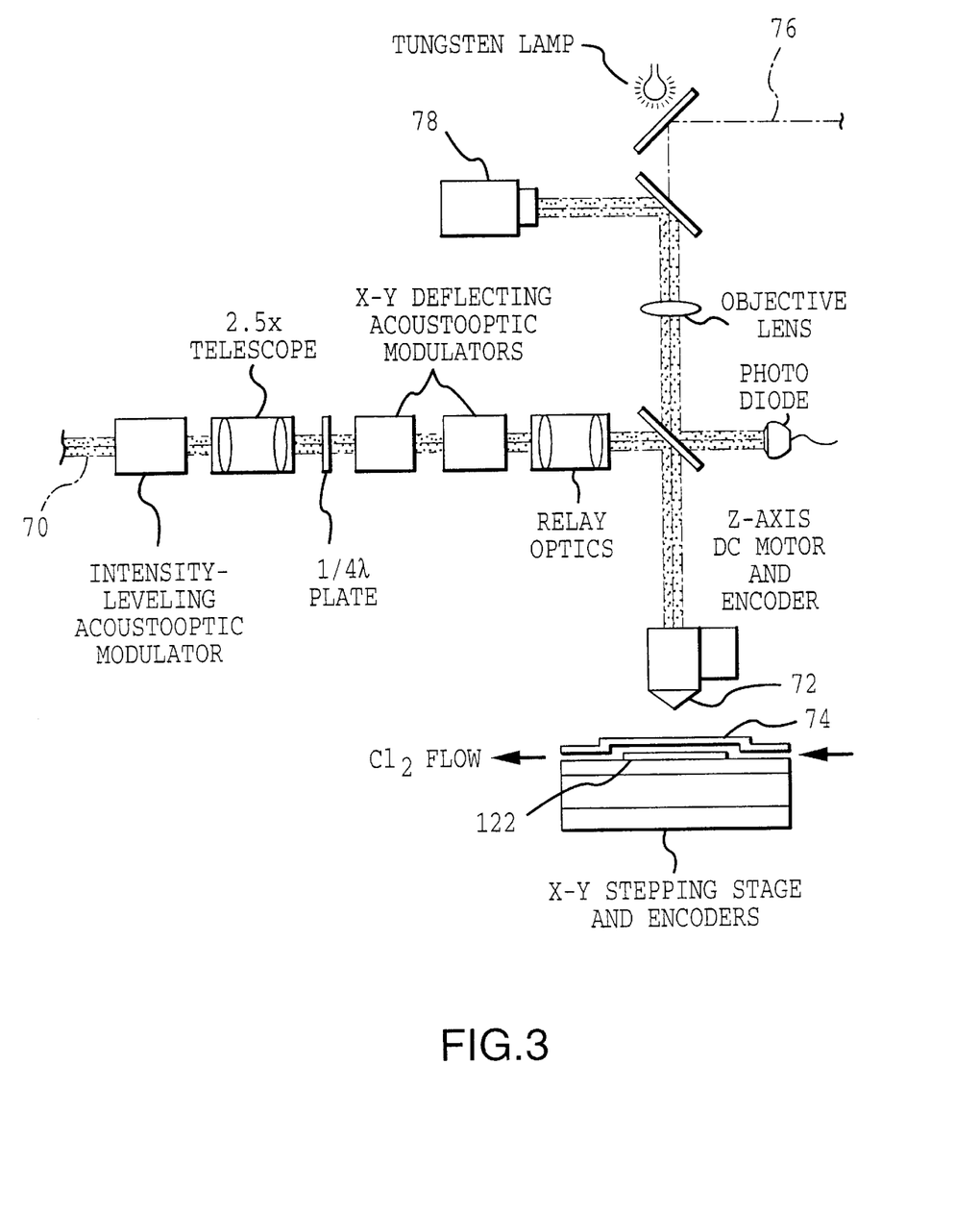
FIG. 3 is a schematic diagram of an apparatus employed for performing a part of the fabrication of a micromachined pump in accordance with the present invention.

FIG. 3 illustrates an acousto-optic scanning apparatus useful for carrying out the LACE-type etching of the pump base 122 to precisely form the above-identified cavity, inlet valve 126, and outlet valve 128. The system uses an acousto-optic scanner to digitally access a 256×256 pixel scanning field with a 0.1 pixel accuracy. Random access rates up to 50,000 pixels per second are achieved and are limited by acoustic wave stabilization in the crystals. The address grid is spaced at 1 $\mu$m increments in the x–y plane. Intensity variations due to the nonlinear transmission of the deflection crystals over the scanning field are compensated using closed-loop feedback by an additional acousto-optic crystal and a photodiode that senses a portion of the output beam.

A 900 mW/488 nm laser beam 70 is focused through a 0.4 NA, 20× flat-field-corrected objective 72 to approximately 1.0 $\mu$m beam size, although the effective reaction zone may be slightly larger due to heat transfer to the highly conducting bulk. The laser beam is projected through a quartz glass cover 74 into a stainless-steel vapor cell containing the pump base 122.

Circularly polarized 488 $\mu$m light from a 15W argon-ion laser is used as the source, and a helium-neon laser beam 76 is also introduced into the system for auto-focusing on the surface, using a spot-minimization algorithm. The silicon-removal reaction is observed through a focusing optic with a charge-coupled device camera 78.

The scanning apparatus is controlled by a computer programmed with a CAD/CAM program to move the silicon pump base 122 relative to the laser beam, thereby to form the intricate shape of the inlet valves and outlet valves, and the pump cavity. The etching process is accomplished when the silicon base is heated to its melting point and reacts nearly at the gas-transport limited rate with chlorine. Volatile silicon chlorides are removed in the slowly flowing gas. Planes of 1 $\mu$m thickness are removed by scanning the beam at 7500 $\mu$m/s (133 $\mu$m/s dwell per 1 $\mu$m pixel) over the areas to be etched in a 100 Torr chlorine ambient. After a plane is etched, the focusing objective is lowered 1 $\mu$m, and a new pattern is etched. Depths are accurately controlled through precise timing of the dwells of each scan plane. Further smoothing is possible if desired by reducing the pressure or laser intensity during the final laser scans.

Figure 4:
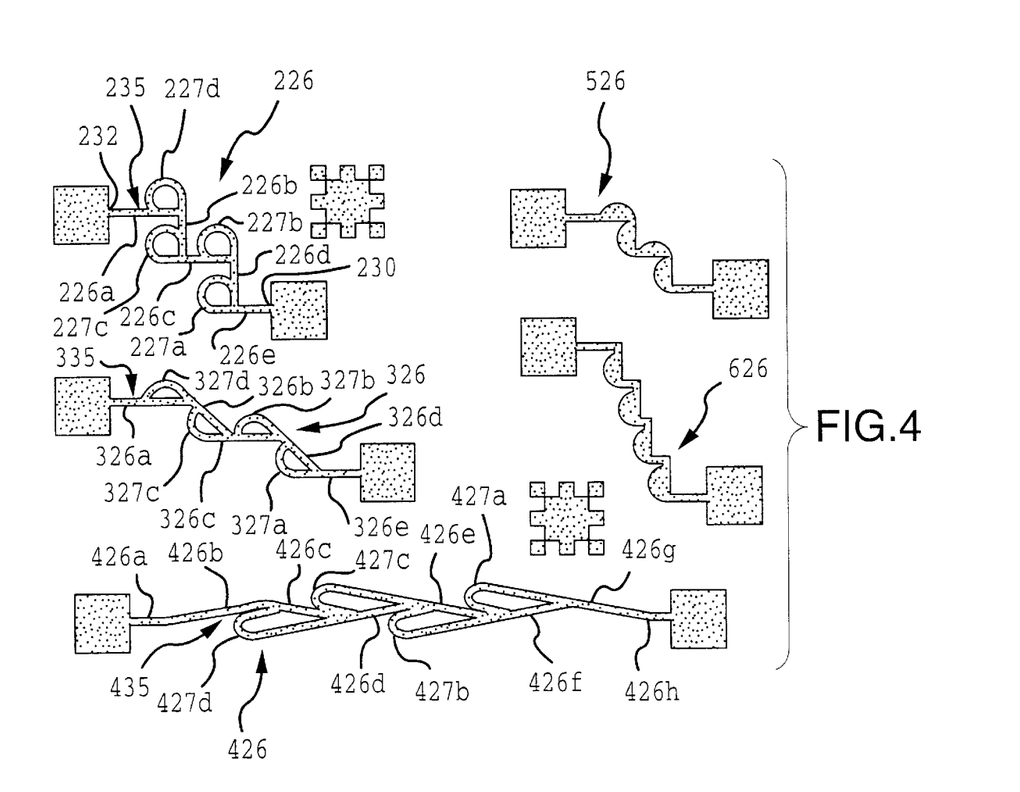
FIG. 4 is an enlargement of a portion of a mask diagram depicting in plan view the shapes of a series of alternative embodiments of the fixed valves of the present invention, the valves shown detached from the pump cavity.

FIG. 4 depicts alternative configurations for the inlet and outlet valves. Only one valve of each inlet and outlet valve pair is shown. In the following discussion, therefore, reference is made to inlet valves, although it will be understood that the discussion also pertains to the identically shaped outlet valves. FIG. 4 comprises reproductions of portions of masks. For purposes of the presently considered embodiment, however, the shapes presented in FIG. 4 depict those preferably formed by the etching process just described.

One valve embodiment 226 depicted in FIG. 4 includes the forward flow conduit portions 226a–e extending between its inner end 230 and its outer end 232. Each junction of the contiguous series of portions 226a–e forms an angle of 90 degrees. Put another way, the forward flow path departs from a straight line by an angle of 90 degrees at each junction. The discrete branches 227a–d are curved such that the confluence of the reverse flow at the downstream junction 235 (here considered in the reverse-flow sense) of each branch tends to redirect the overall momentum of the reverse flow away from the outer end 232 of the conduit.

The configuration of valve 326 shown in FIG. 4 corresponds to the valves described in connection with the embodiment depicted in FIG. 2. In this embodiment, forward flow conduit portions 326a–e join at angles that cause the forward flow direction to depart from a straight line by about 45 degrees. The curved, discrete branches 327a–d are such that the flow outlets from those branches (considered in the reverse direction) intersect the conduit portions 326a–e at about 90 degrees, as shown at junction 335.

The valve depicted at 426 in FIG. 4 includes forward-flow conduit portions 426a–h that are joined in a contiguous series to form an angle that redirects the forward fluid flow by about 22 degrees at each junction. The discrete branches 427a–d are curved such that the outlet of those branches (considered in the reverse flow sense) as shown at junction 435 is such that the flow of fluid from the branch 427d is nearly parallel to the forward flow direction, as defined by the primary components 426a–h.

Valves 526 and 626 shown in FIG. 4 are those valves incorporated into the alternative embodiments of the pump shown in FIGS. 5 and 6 as described next. Before proceeding, however, it is pointed out that valve configurations such as those described herein may be combined in a number of different arrangements. The inlet valve shape and the outlet valve shape need not match. Moreover, factors such as the number of discrete branches may be changed without destroying the overall function of the fixed valves.

Figure 5:
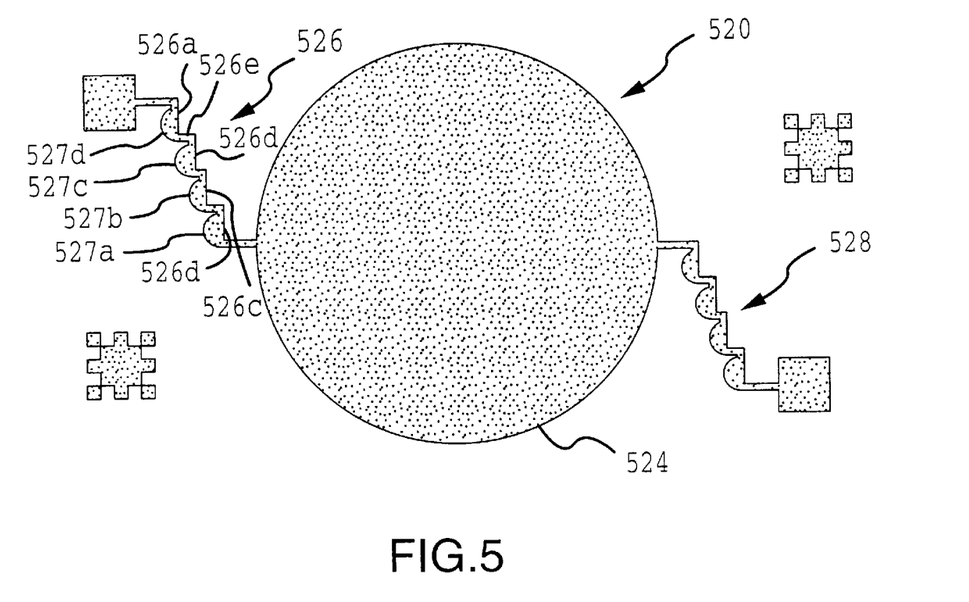
FIG. 5 is an enlarged view of a mask diagram showing in plan view the cavity and inlet and outlet fixed valves of an alternative embodiment of the pump.

FIG. 5 depicts, via an enlarged reproduction of a mask, the primary components of an alternative pump embodiment 520. Those components are the pump inlet valve 526, the pump outlet valve 528 and the pump cavity 524. For simplicity, the pump base, deformable cover plate, and a piezoelectric actuator are not depicted.

The geometry of the inlet valve 526 is such that the flow path in the forward flow direction is primarily defined by the straight walls of the valve shown, for example, at 526a–d. In the reverse flow direction, the valve 526 is configured so that the curved wall portions 527a–d primarily direct the flow. It will be appreciated by reviewing FIG. 5 that the extent of flow redirection attributable to the curved sides 527a–d is substantially greater than the flow redirection in the forward direction, which is attributable to the straight wall portions 526a–d. The flow redirection or flow momentum change imparted by curved surfaces in the reverse direction will, therefore, lead to a relatively higher pressure loss in the reverse flow direction for valve 526. This same effect occurs for the outlet valve 528. As a result, the pump 520 will operate with a diodicity greater than 1.0 and have, therefore, a net forward flow.

Figure 6:
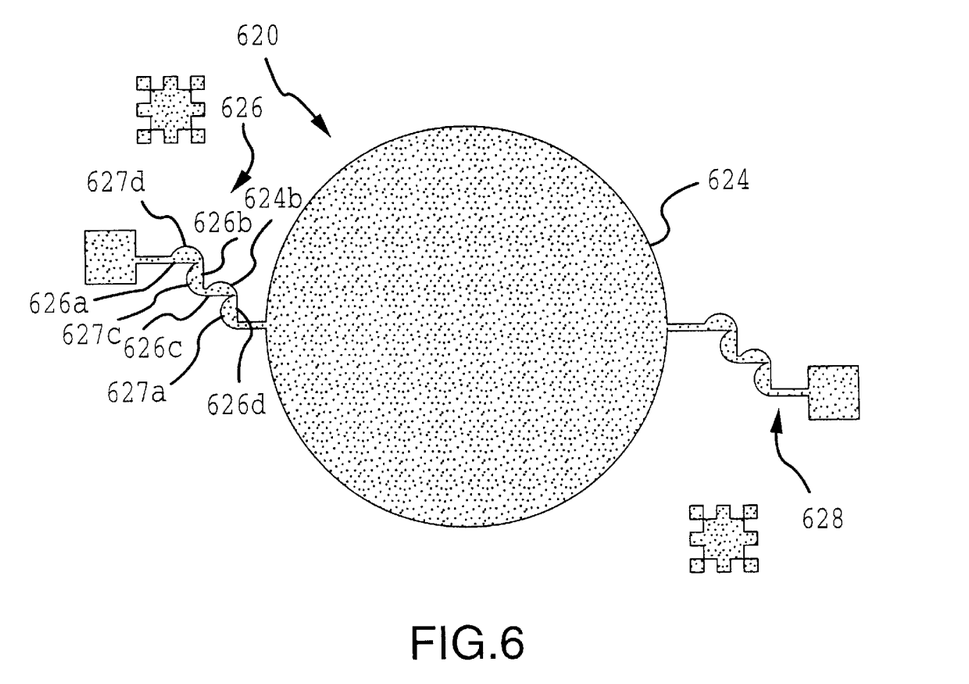
FIG. 6 is an enlarged view of a mask diagram showing in plan view the cavity and inlet and outlet fixed valves of another alternative embodiment of the pump.

FIG. 6 depicts another alternative pump 620 similar to pump 520, except that inlet valve 626 and the outlet valve 628 are modified somewhat over their corresponding valves 526, 528 in the just-described embodiment. In particular, it is noted that for the valves 526, 528 depicted in FIG. 5, each straight-surface portion 526a–d is joined by a short, straight extension part of the conduit, such as shown as 526e. In the embodiment shown in FIG. 6, each of these extension components is lengthened, and one wall of which, such as shown at 627b, is curved to generally match the curvature of the remaining curved walls of the valve, as shown as 627a–d. In the embodiment shown in FIG. 6, the surfaces primarily affecting the redirection of reverse flow are the curved wall surfaces 627a–d. The primary surfaces affecting the redirection of forward flow are the straight surfaces 626a–d. As discussed above with respect to the embodiment of FIG. 5, this arrangement results in higher pressure loss in the reverse direction than in the forward direction, so that the overall pump 620 has a diodicity greater than 1.0.

Figure 7:
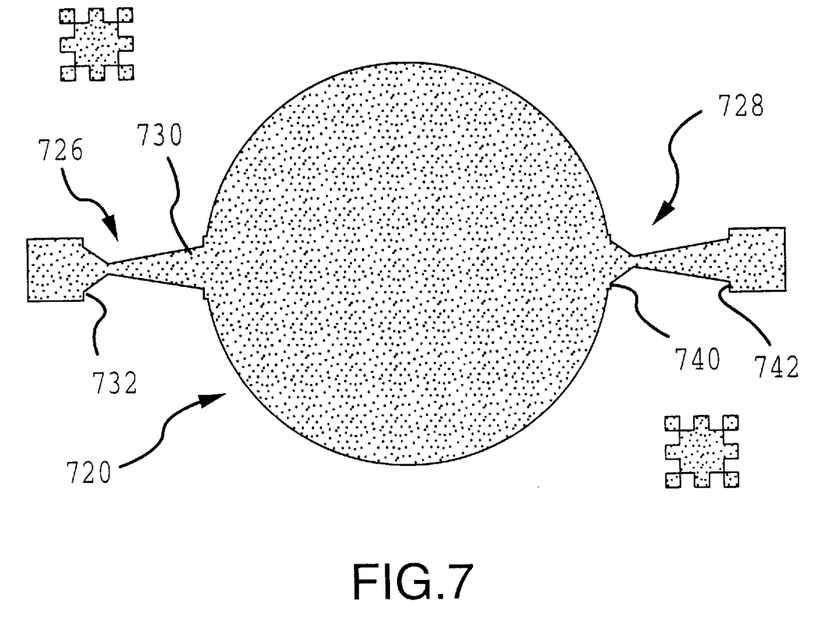
FIG. 7 is an enlarged view of a mask diagram showing in plan view the cavity and the inlet and outlet fixed valves of another alternative embodiment of the pump.

FIG. 7 is an enlarged reproduction of a mask depicting the shapes of the primary components of a micropump formed in accordance of another aspect of the present invention. In particular, FIG. 7 depicts in plan view the shape of a micropump 720 having a cavity 724, an inlet valve 726 and an outlet valve 728. As in earlier-described embodiments, the enlarged mask reproduction is presented for the purpose of depicting the outline of the inlet valve, cavity, and outlet valve. The top plate, piezoelectric member and base are not shown.

In the embodiment of FIG. 7, the inlet valve 726 and the outlet valve 728 define conduits that are shaped so that fluid flow therethrough is restricted less in the forward direction than in the reverse flow direction. Looking first at the inlet valve 726, that valve includes an inner end 730 connected to the cavity 724 and an outer end 732 connectable to a suitable fluid supply. Considering the forward flow direction (left to right in FIG. 7), the substantial length of the inlet valve 726 between the outer end 732 and inner end 730 defines a member that diffuses fluid flow in the forward direction. Alternatively, the substantial length of the inlet valve 726 acts as a nozzle for compressing fluid flow in the reverse direction. Inasmuch as the forward, diffused flow is subject to a lower amount of pressure loss than is the reverse, nozzled flow, the diodicity of the inlet valve will be greater than 1.0.

The outlet valve 728 is configured so that between its inner end 740 and its outer end 742, the substantial length of the inlet valve diffuses fluid flow in the forward direction. The substantial length of the inlet valve in the reverse direction defines a nozzle for compressing flow. Accordingly, as was the case with inlet valve 726, the diodicity of outlet valve 728 is greater than 1.0. As a result, micropump 720 has a net fluid flow in the forward direction.

Figure 8:
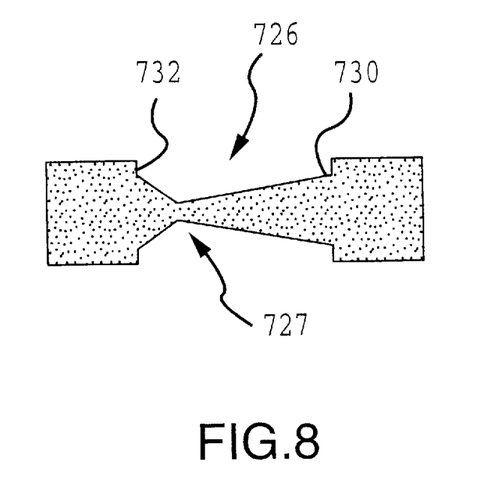
FIG. 8 is a further enlarged view of a portion of FIG. 7, depicting in plan view the shape of one of the fixed valves.

FIG. 8 depicts a further enlarged view of one of the valves of the embodiment described in connection with FIG. 7. This valve may be either the inlet valve 726 or the outlet valve 728, inasmuch as their overall shapes are substantially identical. The inlet valve 726 includes a throat 727 representing the narrowest width of the valve and providing, in conjunction with the diverging side walls in the forward direction, the flow diffusion mentioned above. The performance of the valve 726 is enhanced where sharp edges, such as that defined by the throat 727, are smoothly and precisely rounded. With a pump base that comprises silicon or polysilicon, this rounding can be accomplished using the laser-assisted chemical etching technique described above.

As an alternative to the LACE fabrication process described above, the pump components can be formed by a process known as LIGA, which is an acronym for the German "Litographie, Galvanoformung, Abformung."

A suitable LIGA method includes the application of a thick photoresist on a substantially rigid substrate. Before the photoresist is applied, a plating base must be formed on the substrate, usually by a physical vapor deposition process. After application, the photoresist is cured if required. One acceptable photoresist is poly(methyl methacrylate), abbreviated "PMMA", which can be developed using an aqueous developing system. The photoresist is then exposed to x-rays, preferably high-energy and substantially collimated x-rays, passing through a mask pattern placed over the photoresist. Exposed portions of the photoresist are removed using a suitable developer system, thereby leaving voids in the remaining photoresist. Voids in the photoresist left after developing can be completely filled by any electroplatable substance (Galvanoformung), thereby forming either a structural element or a molding master for the pump components described above.

LIGA exploits deep X-ray lithography to create structures characterized by very steep walls and very tight tolerances. Dimensionally, such structures can range from a few micrometers in size up to about 5 centimeters.

X-ray lithography is well suited for high precision etching or micromachining because x-ray photons have shorter wavelengths and typically higher energies than optical photons. The shorter wavelengths of x-ray photons substantially reduces diffraction and other undesirable optical effects.

X-ray photons are preferably generated using a synchrotron or analogous device, which yields x-ray photons at high flux densities (several watts/cm$^2$) with excellent collimation. As a result of their high energy, these x-rays are capable of penetrating thick (e.g., hundreds of micrometers) layers of polymeric photoresist. It is due to their excellent collimation that x-ray photons penetrate thick photoresists with extremely low horizontal runout (less than 0.1 $\mu$m per 100 $\mu$m thickness), thereby producing the substantially vertical walls.

Although LACE and LIGA processing have been described in detail, it will be appreciated that other micromachining processes may be used, such as reactive ion etching, and sputter etching. Moreover, as described next, wet chemical etching may also be employed.

Figure 9:
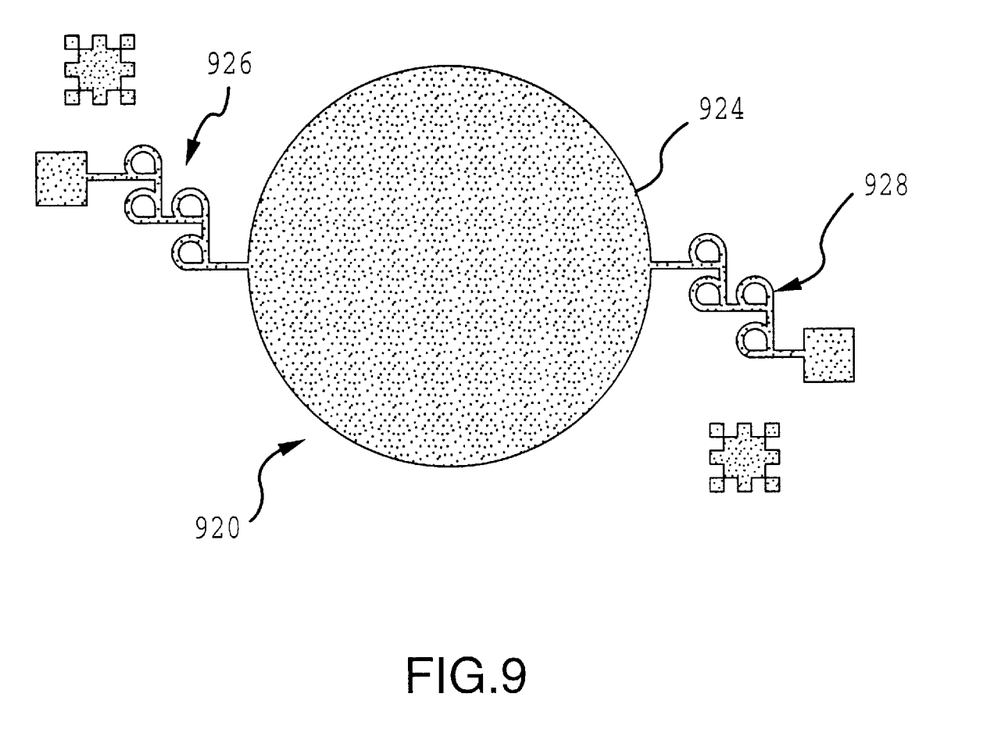
FIG. 9 is an enlarged reproduction of a mask diagram depicting the configuration of a pump cavity and inlet and outlet fixed valves incorporated into a micropump and fabricated in accordance with an alternative process.

FIG. 9 depicts an enlarged reproduction of a mask, showing the inlet valve 926, pump cavity 924 and outlet valve 928 of a micropump 920 formed in accordance with an alternative process; namely, anisotropic wet chemical etching. The following sections entitled "Fabrication," and "Assembly" describe the steps employed for constructing the micropump 920. In this regard, it is noteworthy that any of the embodiments described above may also be constructed using the following fabrication techniques.

Fabrication

Fabrication of the various pump and valve designs consisted of a sequence of bulk silicon micromachining processing steps, preparation of glass cover slips, anodic bonding of the glass cover slips to the silicon, attachment of the piezoelectric actuators, and attachment of input/output tubes (if required).

Specifications of silicon wafers, cover slips, and etching materials are as follows:
(1) Wafers—3 inch, p type, <100>, 5–10 ohm-cm, single sided, prime grade
   From: Silicon Quest International, (408) 496–1000
(2) Pyrex cover slips—25×25 mm, 0.15–0.17 mm thick, No. R625025
   From: ESCO Products, Inc., 171 Oak Ridge Road, Oak Ridge, N.J. 07438; (800)922-ESCO
(3) Ethylenediamine—2 liters, No. E4379; Pyrocatechol—160 g, No. C9510; Pyrazine—6 g, No. P2145
   From: SIGMA Chemical Co., P. O. Box 14508, St. Louis, Mo. 63178-9916; (800)325-3010
The following steps were followed in fabricating the devices:

(1) Perform a standard cleaning procedure on the wafers, then grow 2000 Å or more of oxide on the wafers by heating for 2 hours or more at 1100° C. in oxygen.
(2) Apply an adhesion promoter, then positive photoresist via a photoresist spinner and bake for 30 mins at 90° C. in air.
(3) Align the mask to the wafer, 45 degrees from the <110> flat, and expose to ultraviolet light for 10 seconds at 4 mW/cm$^2$.
(4) Develop using a positive developing solution (approx. 60 seconds) and bake for 30 minutes at 110° C. in nitrogen atmosphere.
(5) Etch the oxide pattern in a buffered hydrofluoric acid solution. All oxide within the pattern should be removed.
(6) Remove the photoresist by rinsing in acetone, then methanol, then DI water.
(7) Prepare the anisotropic etchant solution using the following proportions: 1 liter ethylenediamine, 160 g pyrocatechol, 6 g pyrazine, 133 ml DI H2O, producing etchant EDP Type S.
(8) Etch the wafer for 2 hours at 110° C.; etch rate measured to be 30 micron/hr at this temperature.
(9) Remove the remaining oxide mask by etching in a buffered hydrofluoric acid solution.
(10) Apply photoresist to the finished wafer to protect the surface; then cut it up into individual pumps.
(11) Clean the individual pumps using acetone as in step 6 above.
(12) Drill holes, for the inlet and outlet openings, in the Pyrex cover slips. Use a paste made with silicon carbide grit and water, and a Dremel tool.
(13) Clean the prepared Pyrex cover slip and the pump chip using acetone as in step 6 above, then clean in an oxygen plasma for 10 minutes.
(14) Align the cover slip to the pump chip and place on an anodic bonding apparatus. Anode on the silicon and cathode on the pyrex. Heat to approximately 300 C., then apply from 500 to 1000 volts DC. Watch for a spreading dark region between the Pyrex and the silicon indicating where bonding has occurred. It may be necessary to move the electrodes and reapply the voltage to encourage bonding in stubborn regions. When the dark region covers the chip, the voltage may be removed, and the chip cooled to room temperature.

Assembly

Addresses of suppliers
Piezo Systems, 186 Massachusetts Ave., Cambridge, Mass. 02139; 617/547–1777 617/354–2200 (FAX).
Epoxy Technology, Inc., 14 Fortune Drive, Billerica, Mass. 01821; 800/227–2201 508/663–9782 (FAX).
The final steps in the assembly were
1) Attachment of the piezoelectric disk and its electrical connections.
2) Attachment of inlet and outlet tubes to deliver and receive the pumped fluid.
3) Final coating with an insulating epoxy.

For support and ease of handling, the silicon side of the pump was glued to the end of a standard 1"×3" microscope slide with 5-minute epoxy (Devcon Corp.). A standard 2-pin electrical connector was glued to the opposite end of the slide in order to facilitate connecting the pump to the electrical drive circuit.

Attaching the piezoelectric disks

The piezoelectric material is PSI-5A-S2 Piezoceramic (Piezo Systems) which comes in thin sheets 1.51"×2.5"× 0.0075" thick. It is cut into disks 5 mm and 9 mm in diameter for 6 mm and 10 mm diameter pumps, respectively. The material is cut using a brass tube where the internal diameter of the tube is the size of the finished disk and the wall is about 1 millimeter. The piezoelectric material, being a thin, fragile ceramic, is waxed (using "Crystalbond 509", Aremco Products, Inc.), at approximately 100° C., to a glass plate in order to supply support. The brass tool is chucked into a drill press operating at low speed and is brought down on the piezoelectric material in the presence of #240 grit silicon carbide, with glycerin as a lubricant. The disks are released from the glass support by heating to approximately 100° C. and then washed in acetone.

The piezoelectric material is polarized, the positive side being indicated by a red stripe. The negative side is glued to the pump with a silver-based conductive epoxy (Epoxy Technology, catalog #H31) applied as a thin film to the diaphragm area of the pump and extending to the edge of the die. The epoxy is cured by heating to 100° C. for 1 hour. Electrical attachments are made by gluing the exposed ends of #30 gauge insulated wire to the top of the piezoelectric disk and to the strip of epoxy that extends to the side of the die.

Attaching inlet and outlet tubes (to test pump performance)

In order to attach flexible tubes to the inlet and outlet ports of the pump, it was convenient to first attach short pieces of glass tubing to the ports then attach the flexible tubing to the glass tubing. Short (1 cm) lengths were cut from stock capillary tubing (1.1 –1.2 mm i.d. 0.20 mm wall. Fisher Scientific, Catalog # 02-668-68). Minimal amounts of Crystalbond 509, heated to approximately 100° C., were then used to plug and join the short sections of capillary tubing to the ports. The joint was then filletted with 5-minute epoxy. The Crystalbond 509 served two purposes: it held the tube and the pump rigidly together while the epoxy set and it kept epoxy from leaking into the port. After the epoxy set, the Crystalbond 509 was removed by soaking in warm acetone. Applying an oscillating voltage to the piezoelectric disk at this point facilitated the dissolution of the Crystalbond 509 by acting like an ultrasonic cleaner.

A final coat of hard epoxy (Epoxy Technology #353ND) was applied to the entire surface of the pump in order to electrically insulate it and provide more support for the electrical connections. The epoxy was cured at 100° C. for one hour.

Flexible tubing (26-gauge teflon tubing, i.d. 520 microns, Small Parts, Inc., Catalog #SWTT-26) was inserted into the glass inlet and outlet tubes and sealed by using heat-shrink tubing around the joint.

It will be appreciated that the fixed valves of the present invention can be used in any of a variety of arrangements in fluidic circuits that employ micropumps, and need not be directly attached to a micropump. For example, a single fixed valve in accordance with the present invention can be incorporated into a fluidic circuit downstream of a micropump and serve as a convention one-way or check valve having no moving parts. Similarly, the micropump may be fabricated by surface or bulk techniques and may be, in addition to a diaphragm type, a piston-type, centrifugal type, or any other type formed via micromachining processes.

In view of the wide variety of embodiments to which the principles of our invention can be applied, it should be apparent that the detailed embodiments are illustrative only and should not be taken as limiting the scope of our invention. Rather, we claim as our invention all such modifications as may come within the scope and spirit of the following claims and equivalents thereto.

The invention claimed is:

1. A method for making a micromachined pump comprising the steps of:
   forming a pump cavity in a base;
   forming in the base a first conduit having no moving parts and an inner end connected to the cavity and an outer end, the conduit conducting fluid flow between the inner and outer end along a flow path that departs from a straight line and wherein flow in said first conduit is characterized blow Reynolds numbers where flow is not turbulent,
   forming in the base a second conduit having no moving parts and an inner end connected to the cavity and an outer end; and
   shaping the second conduit so that fluid flow therethrough is restricted less in the direction toward the cavity than in the direction away from the cavity.

2. The method of claim 1 wherein the step of forming the first conduit further comprises forming the first conduit to have a discrete branch that is fluidically joined to the first conduit and configured so that a substantial amount of fluid is directed through the branch when fluid flows through the first conduit in the direction from the outer end to the inner end.

3. The method of claim 2 further comprising the step of forming the second conduit to have a discrete branch that is fluidically joined to the second conduit and configured so that a substantial amount of fluid is directed through the branch when fluid flows through the second conduit in the direction from the inner end of the second conduit to outer end of the second conduit.

4. The method of claim 3 further comprising the steps of:
   covering the cavity with a deformable member to define a cavity volume; and
   mounting to the deformable member an actuator for periodically deforming the member, thereby to periodically change the volume of the cavity.

5. The method of claim 1 further comprising the steps of:
   connecting to the cavity an actuator that is operable for pumping liquid through the first-and second conduits; and
   sizing the first and second conduits and the pump cavity so that the maximum net rate of flow therethrough is less than about 200 $\mu$l/min.

6. The method of claim 1 wherein in the defining step the first conduit has a plurality of generally straight contiguous conduit portions wherein each junction between the conduit portions forms an angle in the flow path defined by the conduit such that the flow path departs from a straight line.

7. The method of claim 6 wherein in the defining step the first conduit has a plurality of discrete branches each of which is fluidically joined to the first conduit so that a substantial amount of fluid is directed through the branch when fluid flows through the first conduit in the direction from the outer end to the inner end.

8. The method of claim 7 wherein in the defining step each branch is joined to the first conduit at a junction between the contiguous conduit portions and wherein the branch rejoins the first conduit at a point toward the inner end of the conduit relative to the junction at which the branch is first joined to the first conduit.

9. A method for making a micro pump comprising the steps of:
   forming a pump cavity in a silicon base
   forming in the base a first conduit having no moving parts and an inner end connected to the cavity and an outer ends the conduit conducting fluid flow between the inner and outer end along a flow path that departs on a straight line;

forming in the base a second conduit having no moving parts and an inner end connected to the cavity and an outer end; and shaping the second conduit so that fluid flow there through is restricted less in the direction toward the cavity than in the direction away from the cavity, wherein the step of forming said first conduit further comprises forming a portion of the first conduit to have a curved sidewall for directing fluid flow therethrough.

10. The method of claim 9 wherein the base is made with silicon and wherein the forming step of said first conduit comprises laser-assisted chemical etching.

11. A micromachined pump apparatus comprising:

a base comprising silicon and having a cavity formed therein a first conduit formed in the base and having, an inner end connected to the cavity and an outer ends and having a flow oath defined by the conduit for conducting fluid between the inner end and the outer end, the first conduit being shared so that the flow path depart from a straight line, thereby to change the direction of flow of fluid therethrough; and a second conduit formed in the base and having an inner end connected to the theretbrough is restricted less in the direction from the outer end to the inner end than in the direction from the inner end to the outer end wherein the first conduit has at least one curved sidewall located so that whenever fluid flows through the first conduit in the direction from the outer end to the inner end, the flow is directed along the curved sidewall.

12. The apparatus of claim 11 wherein the first conduit comprises a plurality of contiguous conduit portions wherein each junction between the conduit portions forms an angle of about 90 degrees in the flow path defined by the conduit.

13. The apparatus of claim 12 wherein each conduit portion has at least one curved sidewall located so that whenever fluid flows through the first conduit in the direction from the outer end to the inner end, the flow is directed against a curved sidewall.

14. A micromachined pump apparatus, comprising:

a base comprising silicon and having a cavity formed therein;

a first conduit formed in the base and having an inner end connected to the cavity and an outer end, and having a flow path defined by the conduit for conducting fluid between the inner end and the outer end, the first conduit being shaped so that the flow path departs from a straight line, thereby to change the direction of flow of fluid therethrough wherein the flow in the conduit is characterized by low Reynolds numbers where flow is not turbulent and a second conduit formed in the base and having an inner end connected to the cavity and an outer end, the second conduit being shaped so that fluid flow therethrough is restricted less in the direction from the outer end to the inner end than in the direction from the inner end to the outer end.

15. The apparatus of claim 14 wherein the first conduit flow path departs from a straight line by an angle greater than about 20 degrees.

16. The apparatus of claim 14 wherein the first conduit flow path departs from a straight line by an angle that is greater than about 40 degrees.

17. The apparatus of claim 14 wherein the first conduit has at least one discrete branch fluidically joined to the first conduit so that a substantial amount of fluid is directed through the branch when fluid flows through the first conduit in the direction from the outer end to the inner end.

18. The apparatus of claim 14 wherein the first conduit comprises a plurality of generally straight contiguous conduit portions wherein each junction between the conduit portions forms an angle of less than 180 degrees in the flow path defined by the conduit.

19. The apparatus of claim 18 wherein the first conduit has at least one discrete branch fluidically joined to the first conduit so that a substantial amount of fluid is directed through the branch when fluid flows through the first conduit in the direction from the outer end to the inner end.

20. The apparatus of claim 19 wherein the first conduit has a plurality of discrete branches each of which is fluidically joined to the first conduit so that a substantial amount of fluid is directed through the branch when fluid flows through the first conduit in the direction from the outer end to the inner end.

21. The apparatus of claim 20 wherein each branch is joined to the first conduit at a junction between the contiguous conduit portions and wherein the branch rejoins the first conduit at a point toward the inner end of the conduit relative to the junction at which the branch is first joined to the first conduit.

22. The apparatus of claim 18 wherein the angle between said conduit portions is about 45 degrees.

23. A method of manufacturing a pump comprising the steps of:

etching a cavity into a surface of a base;

etching an inlet valve into the base and in fluid communication with the cavity, the substantial length of the inlet valve being shaped to diffuse fluid flow in the direction toward the cavity;

etching an outlet valve into the base and in fluid communication with the cavity, the substantial length of the outlet valve being shaped to diffuse fluid flow in the direction away from the cavity;

said inlet and outlet valves being sized to provide low Reynolds number non-turbulent flow therein, and enclosing the cavity with a deformable member to define a cavity volume, the member being deformable for successively increasing and decreasing the cavity volume.

24. The method of claim 23 wherein the etching steps include forming in each of the inlet and outlet valves a throat portion having rounded edges.

25. The method of claim 24 wherein the etching step comprises laser-assisted chemical etching.

26. A micromachined pump system, comprising:

a base;

a valve conduit formed by micromachining in the base and having an inner end and an outer end, and having a flow path defined by the conduit for conducting fluid therethrough, the valve conduit being shaped so that fluid flow therethrough is restricted less in the direction from the outer end to the inner end than in the direction from the inner end to the outer end;

wherein fluid flow in said conduit is characterized by low Reynolds numbers where flow is not turbulent; and a micromachined pump connected to the valve conduit for pumping fluid therethrough.

27. The system of claim 26 wherein the valve conduit is etched into the base by laser-assisted chemical etching.

28. The system of claim 26 wherein the pump is a diaphragm type.

29. The system of claim 26 wherein the micromachined pump is configured and arranged to pump the fluid at a maximum net rate of less than about 200 µl/min.

30. The micromachined pump system of claim 26 wherein the substantial length of the valve conduit is shaped to diffuse fluid flow in the direction towards the cavity.

31. The micromachined pump system of claim 30 further comprising a second valve conduit formed by micromachining in the base and having a flow path defined by the conduit for conducting fluid therethrough and connected to the micromachined pump for pumping fluid therethrough, the second valve conduit being shaped so that fluid flow therethrough is restricted less in the direction from the inner end to the outer end than in the direction from the outer end to the inner end.

32. The micromachined pump system of claim 31 wherein the substantial length of the second valve conduit is shaped to diffuse fluid flow in the direction away from the cavity.

33. A micromachined pump apparatus comprising:
   a base comprising silicon and having a cavity formed therein;
   a first conduit formed in the base and having an inner end connected to the cavity and an outer end, and having a flow path defined by the conduit for conducting fluid therethrough, the first conduit being shaped so that the flow path departs from a straight line by an angle of about 90° thereby to change the direction of flow of fluid therethrough; and
   a second conduit formed in the base and having an inner end connected to the cavity and an outer end, and having a flow path defined by the conduit for conducting fluid between the inner end and the outer end, the second conduit being shaped so that fluid flow therethrough is restricted less in the direction from the outer end to the inner end than in the direction from the inner end to the outer end.

34. The apparatus of claim 33 wherein the first conduit has at least one discrete branch fluidically joined to the first conduit so that a substantial amount of fluid is directed through the branch when fluid flows through the first conduit in the direction from the outer end to the inner end.

35. The apparatus of claim 34 wherein the first conduit comprises a plurality of generally straight contiguous conduit portions wherein each junction between the conduit portions forms an angle of about 90 degrees in the flow path defined by the conduit.

36. The apparatus of claim 35 wherein the first conduit has a plurality of discrete branches each of which is fluidically joined to the first conduit so that a substantial amount of fluid is directed through the branch when fluid flows through the first conduit in the direction from the outer end to the inner end.

37. The apparatus of claim 36 wherein each branch is joined to the first conduit at a junction between the contiguous conduit portions and wherein the branch rejoins the first conduit at a point toward the inner end of the conduit relative to the junction at which the branch is first joined to the first conduit.

38. The apparatus of claim 33 wherein the second conduit has at least one discrete branch fluidically joined to the second conduit so that a substantial amount of fluid is directed through the branch when fluid flows through the second conduit in the direction from the inner end to the outer end.

39. A micromachined pump apparatus comprising:
   a base comprising silicon and having a cavity formed therein;
   a first conduit formed in the base and having an inner end connected to the cavity and an outer end, and having a flow path defined by the conduit for conducting fluid been the inner end and the outer end, the first conduit being shaped so that the flow oath departs from a straight line thereby to change the direction of flow of fluid therethrough: and
   a second conduit formed in the base and having an inner end connected to the cavity and an outer end, the second conduit being, shaped so that fluid flow therethrough is restricted less in the direction from the outer end to the inner and than in the direction from the inner end to the outer end; and
   a deformable cover plate secured to the base covering the cavity and the first and second conduits.

40. The apparatus of claim 39 further comprising an actuator in contact with said cover plate to provide periodic deformation of the cover plate.

41. A micromachined pump system, comprising:
   a base;
   a valve conduit formed by micromachining in the base and having an inner end and an outer end, and having a flow path defined by the conduit for conducting fluid therethrough, the valve conduit being shaped so that fluid flow therethrough is restricted less in the direction from the outer end to the inner end than in the direction from the inner end to the outer end; and
   a micromachined pump connected to the valve conduit for pumping fluid therethrough, wherein the valve conduit has at least one curved sidewall located so that whenever fluid flows through the valve conduit in the direction from the outer end to the inner end, the flow is directed along the curved sidewall.

42. A micromachined pump system, comprising:
   a base;
   a valve conduit formed in the base and having an inner end and an outer end, and having a flow path defined by the conduit for conducting fluid therethrough, the valve conduit being shaped so that fluid flow therethrough is restricted less in the direction from the outer end to the inner end than in the direction from the inner end to the outer end; and
   a micromachined pump connected to the valve conduit for pumping fluid therethrough wherein the valve conduit is shaped so that the flow path departs from a straight line by an angle of about 90° changing the direction of flow of fluid therethrough.

43. A micromachined pump system, comprising:
   a base;
   a valve conduit formed in the base and having an inner end and an outer end, and having a flow path defined by the conduit for conducting fluid therethrough, the valve conduit being shaped so that fluid flow therethrough is restricted less in the direction from the outer end to the inner end than in the direction from the inner end to the outer end and shaped so that the flow path departs from a straight line wherein flow through the valve conduit is characterized by low Reynolds numbers where flow is not turbulent;
   a micromachined pump connected to the valve conduit for pumping fluid therethrough.

* * * * *

UNITED STATES PATENT AND TRADEMARK OFFICE
CERTIFICATE OF CORRECTION

PATENT NO. : 5,876,187

DATED : March 2, 1999

INVENTOR(S) : Forster, et. al.

Page 1 of 2

It is certified that error appears in the above-identified patent and that said Letters Patent is hereby corrected as shown below:

Drawings:
At sheet 4, Figure 4, upper right valve, please replace reference numeral "526" with --626--.
At sheet 4, Figure 4, lower right valve, please replace reference numeral "626" with --526--.
At sheet 5, Figure 5, please replace reference label "526d" with --526b--.
At sheet 5, Figure 6, please replace reference label "624b" with --627b--.
At sheet 6, Figure 7, please apply reference numeral --724-- to the cavity connected to the inner ends 730 and 740.
At column 12, line 10, please replace "blow" with --by low--.
At column 13, line 1, please replace "ends" with --end--.
At column 13, line 2, please replace "on" with --from--.
At column 13, line 20, please replace "ends" with --end--.
At column 13, line 21, please replace "oath" with --path--.
At column 13, line 23, please replace "shared" with --shaped--.
At column 13, line 23, please replace "depart" with --departs--.
At column 13, line 27, after "to the" please insert --cavity and an outer end, the second cavity being shaped so that fluid flow--.
At column 13, line 27, please replace "theretbrough" with --therethrough--.

UNITED STATES PATENT AND TRADEMARK OFFICE
CERTIFICATE OF CORRECTION

PATENT NO.  : 5,876,187
DATED       : March 2, 1999
INVENTOR(S) : Forster, et. al.

It is certified that error appears in the above-identified patent and that said Letters Patent is hereby corrected as shown below:

At column 16, line 7, please replace "been" with --between--.
At column 16, line 8, please replace "oath" with --path--.
At column 16, line 15, please replace "and" with --end--.

Signed and Sealed this

Seventh Day of March, 2000

Attest:

Q. TODD DICKINSON

Attesting Officer

Commissioner of Patents and Trademarks